United States Patent
Grenader et al.

(10) Patent No.: US 6,231,060 B1
(45) Date of Patent: May 15, 2001

(54) VEHICLE WITH CONTROLLED RUNNING WHEELS

(76) Inventors: Michael Grenader, 50/15, Hativat Carmeli st., Haifa (IL), 32629; Roman Partigula, 125 Beach 19 St. Ap. 14a, Far Rockaway, NY (US) 11691

( * ) Notice: Subject to any disclaimer, the term of this patent is extended or adjusted under 35 U.S.C. 154(b) by 0 days.

(21) Appl. No.: 09/415,694

(22) Filed: Oct. 8, 1999

Related U.S. Application Data

(60) Provisional application No. 60/103,896, filed on Oct. 13, 1998.

(51) Int. Cl.[7] .................................................... B62D 7/15

(52) U.S. Cl. ....................... 280/99; 74/471 XY; 280/91.1

(58) Field of Search .............................. 280/99, 100, 101, 280/102, 103, 91.1; 74/471 XY

(56) References Cited

U.S. PATENT DOCUMENTS

| | | | | |
|---|---|---|---|---|
| 1,255,775 | * | 2/1918 | Mueller | 280/99 |
| 5,288,091 | * | 2/1994 | Deschamps | 280/99 |
| 5,752,578 | * | 5/1998 | Kellogg | 280/91.1 |
| 5,862,874 | * | 1/1999 | Brienza et al. | 280/91.1 |

* cited by examiner

*Primary Examiner*—Anne Marie Boehler

(57) ABSTRACT

The vehicle with controlled running wheels according to this invention comprises a steering system with a reference-unit element and units for matching of wheels turn angles. Each of the matching units incorporates a tracer pin and guide slot. The number of guide slots is equal to the number of controlled wheels. The tracer pin cinematically connected with the reference-unit element, and each guide slot—with the appropriate wheel. All set-point devices are located equidistant to each other and have a common axis of a turn. The tracer pin is hinged on an axis of a turn of set-point devices, with a capability of the turn in any of several planes.

4 Claims, 6 Drawing Sheets

VEHICLE WITH CONTROLLED RUNNING WHEELS

This application claims priority of U.S. Provisional Application Ser. No. 60/103,896, filed Oct. 13, 1998 and is hereby incorporated by reference in its entirety.

BACKGROUND OF THE INVENTION

The invention relates to off-track vehicles, specifically, to self-propelled vehicles with controlled running wheels.

There is a widely known vehicle with controlled running wheels incorporating a steering with a reference-unit element built in the form of a steering wheel and having set-point devices of wheel turn angles. The set-point devices are kinematically linked to the reference-unit element by means of the steering trapezium which represents a matching unit for turn angles of a wheel pair and is intended for ensuring a preset movement path of a vehicle turn center.

The said vehicle has a number of faults, which are as follows:
The accomplishment of the wheel turn matching unit in the form of a steering trapezium rules out the possibility of turning the wheels through angles not exceeding 30–40° which considerably restricts the vehicle maneuverability;
The use of the matching unit (steering trapezium) for a direct linkage between the wheel pair predetermines the possibility of realizing only the straight path of the vehicle turn center movement. The straight path coincides with the vehicle transverse axis, which also restricts its maneuverability.

There is also a well-known vehicle with controlled running wheels in which each wheel is linked to its matching unit and to its turn angle set-point device, in which the matching units and set-point devices made in the form of computer and electromechanical converter devices.

In a vehicle like this there are no faults inherent in the previous analogue. However the use of computer and electromechanical devices complicates the vehicle design.

OBJECTS AND SUMMARY OF THE INVENTION

Used as a basis for the invention is the task of creating a vehicle with controlled running wheels in which the matching unit would incorporate such elements which would be made in such a manner and linked to each other in such a way and the number of set-point devices would be that which could increase the range of wheel turn angles retaining the matching of the wheel turn angles and preserving the simplicity of the vehicle design and also ensure the possibility of realizing various movement paths of the vehicle turn center, including curved paths as well, and in so doing raise the vehicle maneuverability.

The set task is solved in such a way, that the vehicle with controlled running wheels incorporates a steering device with a reference-input element and with turn angle set-point devices linked kinematically with the reference-input element by means of matching units of wheel turn angles intended for ensuring a preset movement path of the vehicle turn center, and each matching unit incorporating a tracer pin and a guide slot.

One of the said components of the matching unit is linked to the reference-input element and the other—to the set-point device, in this case the number of the set-point devices and the number of the said guide slots is equal to the number of wheels controlled by them. All the said set-point devices are turnable and arranged equidistant to each other, and the said tracer pin is installed with a possibility of turning in any of several planes.

BRIEF DESCRIPTION OF THE DRAWINGS

The essence of the invention is illustrated by the drawings in which.

DETAILED DESCRIPTION OF THE PREFERRED EMBODIMENTS

Figure 1:
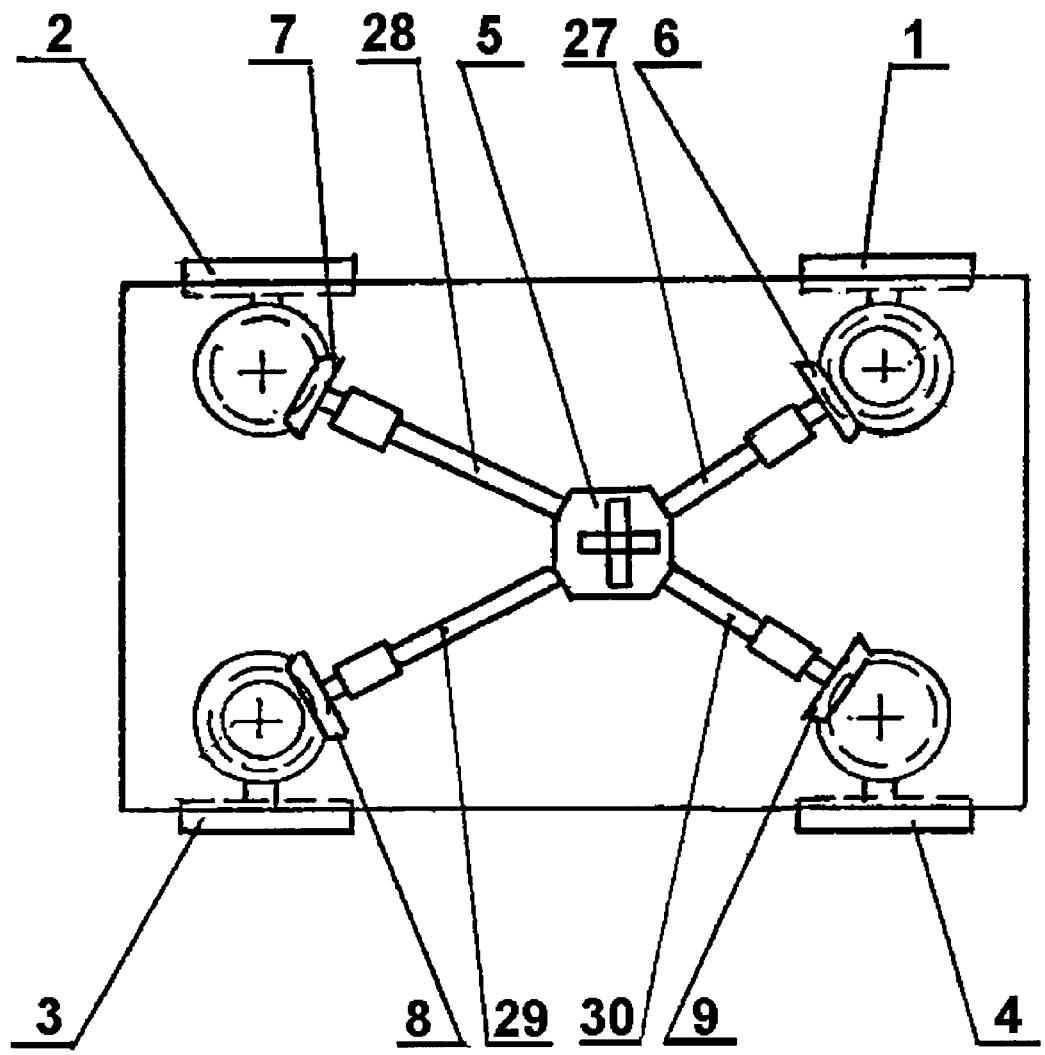
FIG. 1—shows a vehicle according to the invention, top view.

The vehicle contains four controlled running wheels (1, 2, 3, 4) (FIG. 1). Wheels (1) and (3) located along one of the vehicle diagonals are drive wheels. The location of drive wheels along the diagonal ensures better controllability when maneuvering with small radius of curvature and at great wheel turn angles. Wheel (2) and (4) located along the other diagonal are driven ones.

Each of wheels (1 ... 4) is kinematically linked to steering device (5) by means of corresponding reduction gears (6, 7, 8, 9). Depending on concrete requirements to a vehicle the linkage of the steering with the wheels can be of different kind, for example, electric or hydraulic one.

Figure 2:
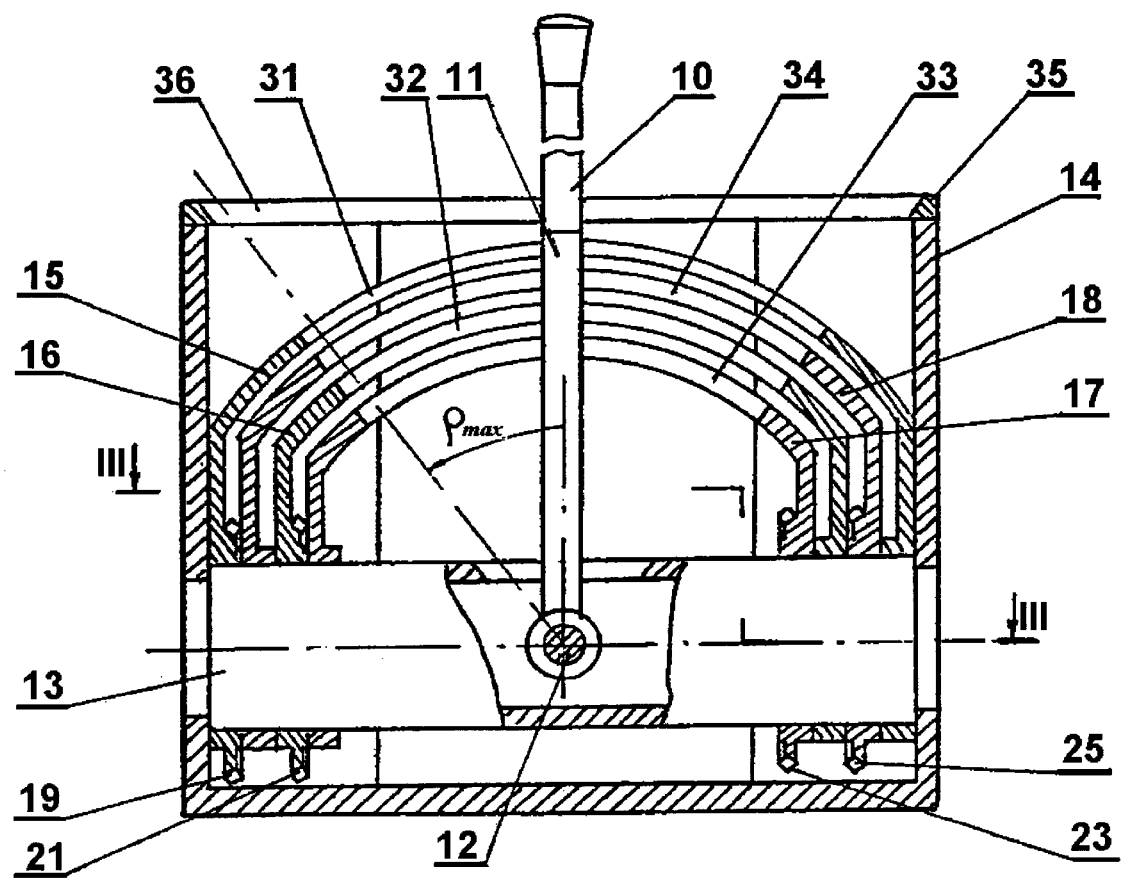
FIG. 2—steering device with set-point devices in initial position, vertical section.
Figure 3:
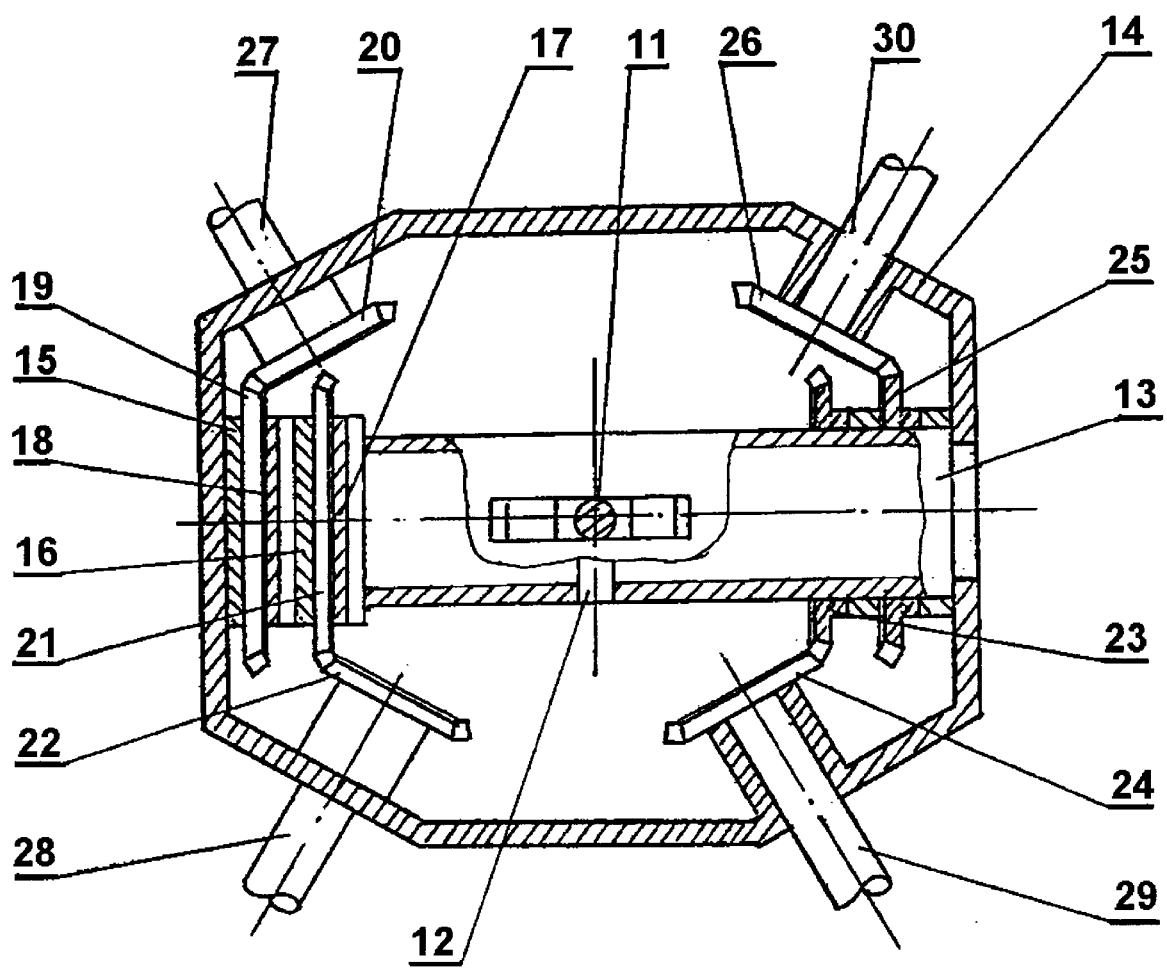
FIG. 3—section III—III in FIG. 2.
Figure 5:
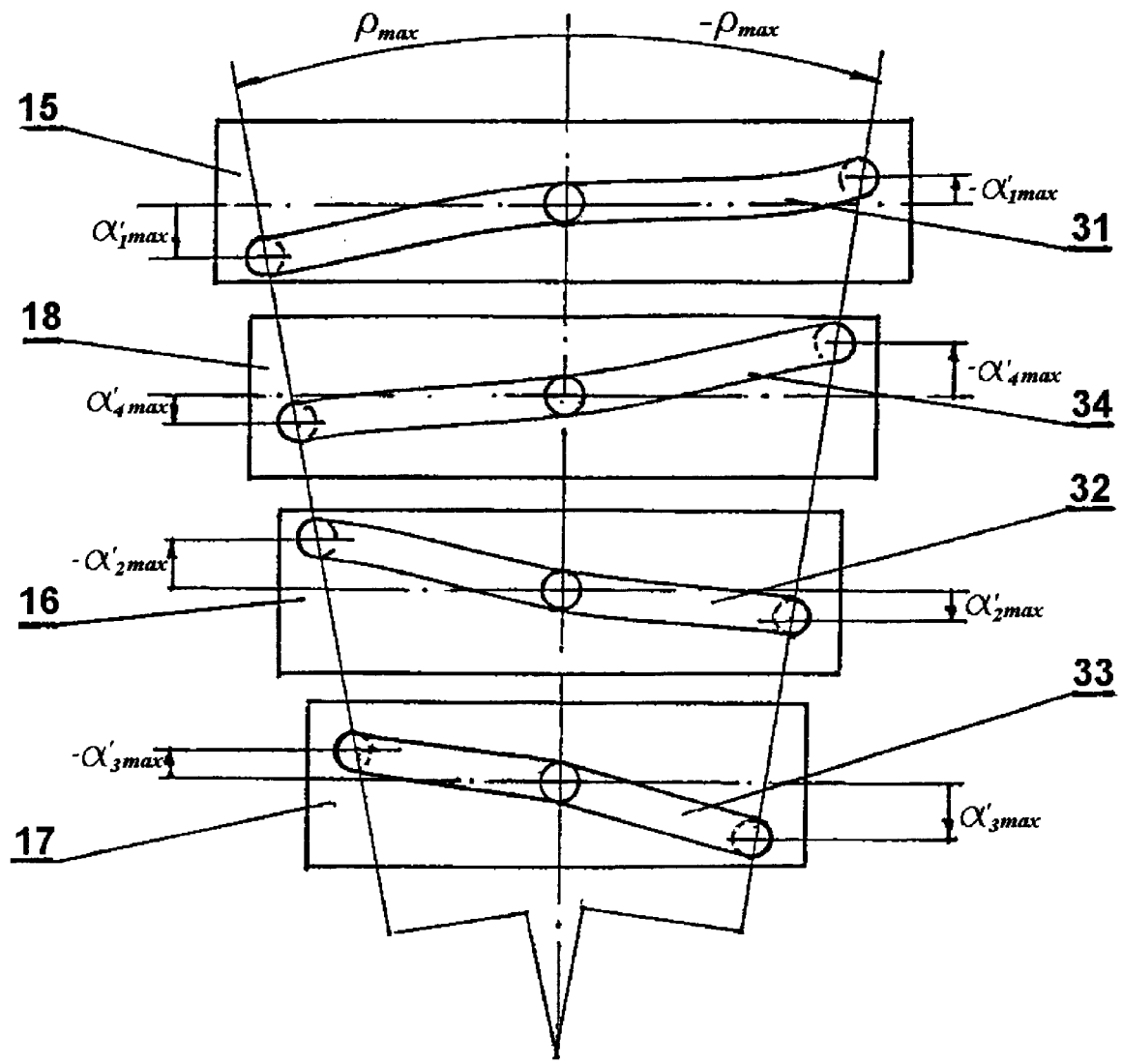
FIG. 5—schematic display of set-point device slots conventionally shifted relative to each other.

The steering system incorporates steering lever (10) (FIG. 2) which represents a reference-input element and tracer pin (11) linked to it rigidly. One of the ends of tracer pin (11) is hinged on shaft (12), which is perpendicular to the geometrical axis of bushing (13) mounted inside housing (14) of the steering with the possibility of turning around the bushing longitudinal axis. Bushing (13) accommodates set-point devices (15, 16, 17, 18) of wheel turn angles; the set-point devices can turn around the bushing and also— relative to each other. Set-point devices (15 ... 18) are made in the form of plates taking the shape of an arc arranged equidistant to each other and by means of pairs of gears (19) and (20), (21) and (22), (23) and (24), (25) and (26) (FIG. 3) and shafts (27), (28), (29), (30) are linked to wheel turn reduction gears (6, 7, 8, 9) respectively. Set-point devices (15 ... 18) accommodate slots (31), (32), (35), (34) on their middle portions with the second end of tracer pin (11) inserted into them. FIG. 5 shows one of the versions of the geometrical forms of the slots accomplishment. Slots (31 ... 34) represent guides for the tracer pin. The said slots (31 ... 34) in conjunction with tracer pin (11) represent the matching units of the wheel turn angles.

Other versions of the design accomplishment of the wheel turn angle matching unit are possible, for example, the guide for the tracer may be accomplished in the form of a cam linked to the reference-input element, and a tracer can be made in the form of a follower linked to the set-point device.

The geometrical shape of slots (31 ... 34) is determined by the relationship among the angle ρ of the tracer pin deviation from the initial position, parameters of the vehicles turn center movement path and angle α—of the turn of a corresponding set-point device.

The said relationship has been derived from the known regularities of the coordinated turn of the vehicle wheels.

Figure 6:
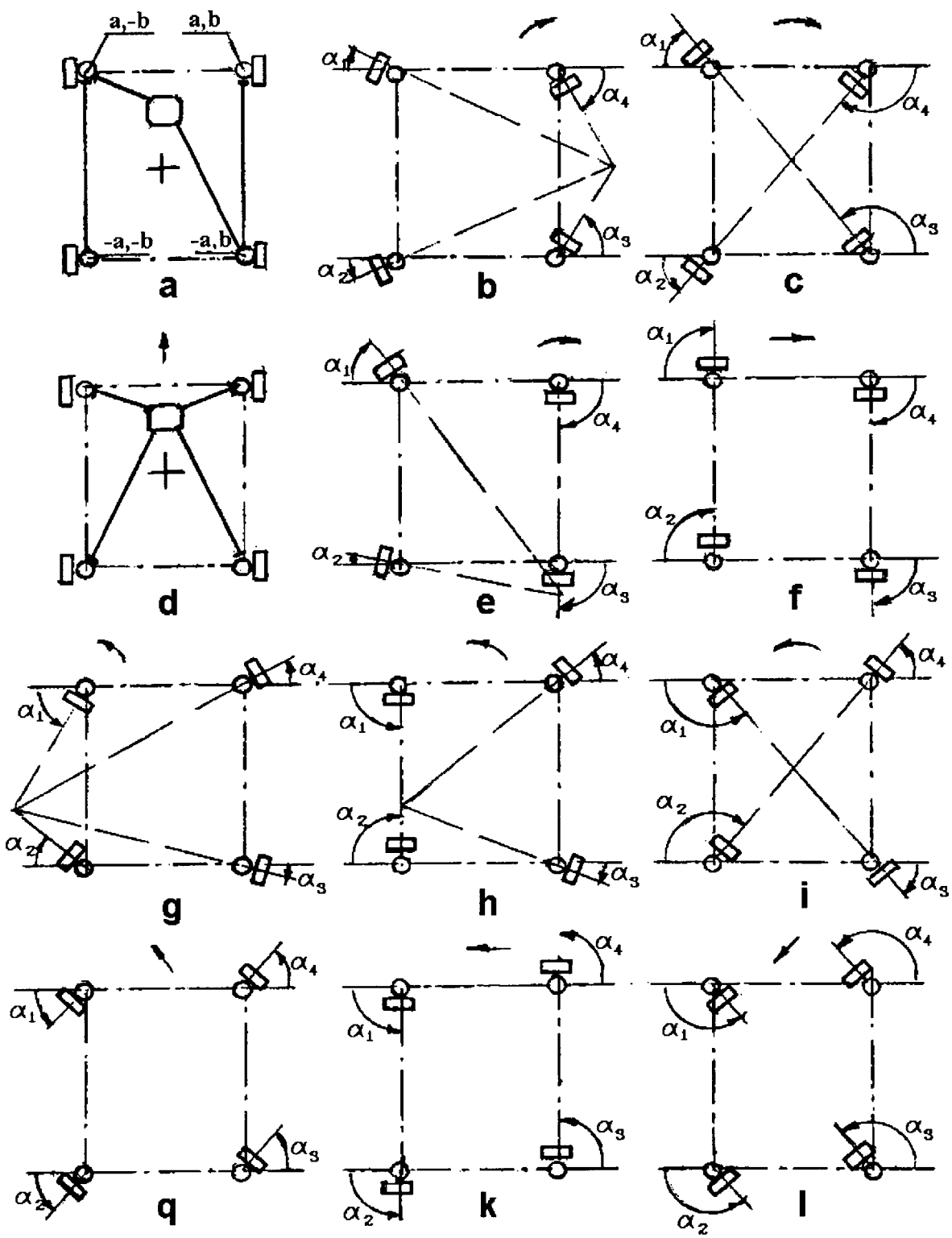
FIG. 6—diagrams of wheel turns at various movement paths of a vehicle turn center.

For the described version of the steering design in which the preset turn center movement path of the vehicle coincides with its transverse axis (corresponds to the diagram of the wheel turn, FIG. 6(a, b, c) this relationship takes the form:

$$\alpha' = \frac{\text{arctg}\frac{\pm a}{\frac{c*\cos(m\rho)}{\sin(m\rho)} \mp b}}{i}$$

where:
- α'—angle of set-point device deviation from initial position;
- i—transmission ratio between the angles of the wheel turn and the set-point device corresponding to it;
- ρ—angle of tracer pin deviation from initial position in the plane of its turn;
- $m=90°/\rho_{max}$—scale factor determined by design parameters of the steering device;
- a and b—coordinates of the turn center corresponding to the wheel set-point device in the axes of coordinates formed respectively by the vehicle transverse and longitudinal axes;
- c—parameter predetermining a preset coefficient of the radius change non-linearity of the vehicle turn curvature.

Figure 4:
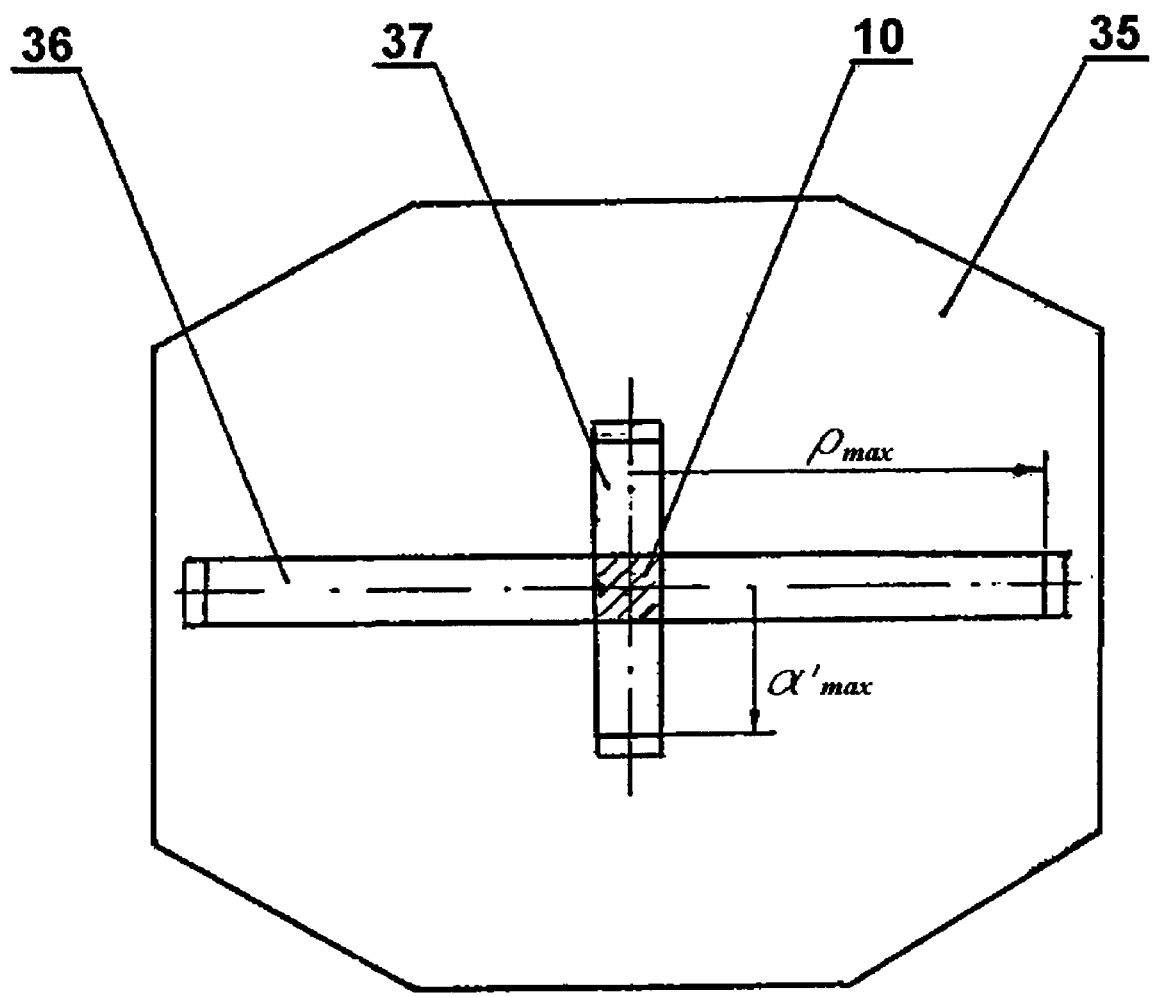
FIG. 4—steering device top view.

Cover (35) (FIG. 4) of housing (14) of the steering carries mutually perpendicular slots (36), (37) in which steering lever (10) is freely installed. In its initial position steering lever (10) with tracer pin (11) passes through the intersection point of slots (36) and (37). In this case the longitudinal axis of slot (36) and the axes of the turn of all set-point devices are located in one plane which represents a plane of initial position for all set-point devices. Slot (36) makes it possible to realize the turn of tracer pin (11) in this plane and is intended for realizing the vehicle turn center movement path which corresponds to the conditions of curved maneuvering. Slot (37) allows to realize the turn of tracer pin (11) in the plane located at a 90° angle to the said initial position plane and is intended for realizing the turn center movement path corresponding to the conditions of plane-parallel maneuvering. The length of slot (36) is selected proceeding from the necessity of ensuring the steering lever deviation to both directions from the initial position to the maximum angle $\rho_{max}$ which ensures the turn of all the wheels for driving a vehicle with a preset maximum turning radius.

The length of slot (37) is selected proceeding from the necessity of the deviation of the steering lever and all set-point devices to both directions from the initial position at an angle $\alpha'_{max}$ corresponding to the plane-parallel turn of all the wheels to ensure the movement over the entire range of preset vehicle movement directions.

Depending on concrete conditions slots (36) and (37) may take a different configuration, they may be increased in number and take a different orientation.

FIG. 6 shows some versions of maneuvering of the vehicle at various shapes of grooves accomplished in set-point devices and with the steering lever moving along slot (36). The values of $\alpha_1 \ldots \alpha_4$ displayed in the Figure correspond to the angles of the turn of wheels (1 . . . 4).

FIGS. 6(a, b, c) shows a version of accomplishment and maneuvering capabilities of a vehicle with a preset straight movement path of its turn center.

The pair of diagonally located driving wheels is connected with the steering set-point devices.

Other two wheels located symmetrically relative to the aforesaid wheel pair are linked with it directly and kinematically with the possibility of ensuring the turn in an opposite direction. This solution facilitates the design of this vehicle version since it allows to controlling four wheels by means of two set-point devices.

In this case the transversal movement of the vehicle in the plane-parallel maneuvering mode is possible. Upon this, when all wheels are turned on 90 degrees, the drives of driving wheels are switched off.

FIGS. 6(d, e, f) shows the versions of a vehicle with all its wheels controlled by set-point devices on the basis of the more complicated preset turn center movement path. This path first allows to changing the radius of the vehicle turn and after that—to arrange the wheels in a plane-parallel position at a required angle to the vehicle longitudinal axis.

According to the version shown in FIGS. 6(g, h, i) the path is represented by a broken line marked through the intersection center of the vehicle longitudinal and transverse axes. This ensures the turn of the vehicle with minimum by a radius.

According to the version shown in FIGS. 6(q, k, l) a possibility of a plane-parallel turn of all the wheels is ensured in a preset range by means of moving the steering lever in slot (37). Thus regardless of the set shape of slots (31 . . . 34) the turn of all set-point devices through one and the same angle is ensured.

Control of a vehicle turn is implemented by means of moving steering lever (10) in slot (36) or (37). When moving lever (10) in slot (36) a mode of curved maneuvering is realized since pin (11) which is an extension of the lever moves simultaneously in slots (31 . . . 34). In this case set-point devices (15 . . . 18) turn through various angles ($\alpha_1 \ldots \alpha_4$) corresponding to the required angles of the wheel turn.

By means of pairs of gears (19 and 20), (21 and 22), (23 and 24), (25 and 26), shafts (27 . . . 30) and reduction gears (6 . . . 9) a required transmission ratio and the turn of corresponding wheels through required angles ($\alpha_1 \ldots \alpha_4$) are ensured. The movement of lever (10) in slot (37) realizes the mode of plane-parallel maneuvering since, in this case the movement of pin (11) in slots (31 . . . 34) is ruled out. A direct effect of pin (11) on all set-point devices (15 . . . 18) takes place, which ensures their turn through similar angles and, consequently, plane-parallel turn of all wheels (1 . . . 4) through a required angle in a needed direction. The transfer from one maneuvering mode to another can also be realized during the movement of a vehicle.

The version of a vehicle accomplishment displayed in FIGS. 6(a,b,c) could be appropriate for use in large-scale vehicles which will considerably increase their maneuverability on the road.

The version of a vehicle accomplishment displayed in FIGS. 6(d, e, f) could be appropriate for use in urban motorcars, which will considerably facilitate their maneuvering on parking.

The version of accomplishment shown in FIGS. 6(g, h, i, q, k, l) could be appropriate for use for buses, industrial and special-purpose vehicles, operating under inconvenient maneuvering conditions.

Thus the proposed vehicle as compared to the existing analogues offers much greater range of wheel turn angles and much better maneuvering possibilities under conditions of both turn curvature change and plane-parallel movement.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A vehicle with controlled running wheels comprising:

steering system with a reference-unit element and set-point devices of wheel turn angles;

said set-point devices are established in the steering housing and linked kinematically with the reference-unit element by means of matching units of wheel turn angles;

each of the matching units incorporates a tracer pin and a guide slot for said tracer pin;

all the said set-point devices are turnable and arranged equidistant to each other;

the said guide slot is located on a turning part of each set-point device, and the number of the said set-point devices is equal to the number of controlled wheels, linked kinematically with set-point devices by means of shafts;

the tracer pin is linked to the said reference-unit element, one end of the pin is hinged in a point common for the axes of turn of all set-point devices, and the second end of the pin is freely linked with the set-point devices by means of their slots;

an angle and direction of a turn of each said set-point device are depending on a plane and turn angle of the tracer pin, and also on the slot shape determined by the parameters of the preset turn center movement path of the vehicle;

the said tracer pin is installed with a possibility of turning in any of several planes.

2. The vehicle according to claim 1, wherein:

the reference-unit element built in the form of steering lever rigidly linked with the tracer pin;

the tracer pin is established with a capability of a turn in two mutually perpendicular planes;

mutually perpendicular straight slots are formed in an upper part of said steering housing;

a length of one of the straight slots corresponds to preset maximum deviation of the steering lever from its initial point, in a curved maneuvering mode;

a length of the other straight slot corresponds to a preset maximum deviation of the steering lever from its initial point, in a plane-parallel maneuvering mode;

the axes of a turn of all set-point devices coincide and lie in one plane with a longitudinal axis of the slot for a curved maneuvering mode.

3. The vehicle according to claim 1, wherein:

pairs of wheels arranged symmetrically about transversal axis of the vehicle are kinematically linked between each other in a way that ensures their turn in opposite directions;

two wheels located on a diagonal of the vehicle are connected to two said set-point devices of the steering system.

4. The vehicle according to claim 2, wherein:

pairs of wheels arranged symmetrically about transversal axis of the vehicle are kinematically linked between each other in a way that ensures their turn in opposite directions;

two wheels located on a diagonal of the vehicle are connected to two mentioned set-point devices of the steering system.

* * * * *